United States Patent [19]
Blok et al.

[11] Patent Number: 5,994,448
[45] Date of Patent: Nov. 30, 1999

[54] HIGH PERFORMANCE TIRE TREAD RUBBER COMPOSITION

[75] Inventors: Edward John Blok, Wadsworth; Paul Harry Sandstrom, Tallmadge; Wen-Liang Hsu, Cuyahoga Falls; Adel Farhan Halasa, Bath, all of Ohio

[73] Assignee: The Goodyear Tire & Rubber Company, Akron, Ohio

[21] Appl. No.: 09/133,503

[22] Filed: Aug. 12, 1998

[51] Int. Cl.$^6$ ....................................................... C08K 3/00
[52] U.S. Cl. ........................... 524/492; 524/493; 525/191; 525/201; 525/232; 525/236; 525/237
[58] Field of Search ..................................... 524/492, 493; 525/101, 201, 232, 236, 237

[56] References Cited

U.S. PATENT DOCUMENTS

| | | | |
|---|---|---|---|
| 5,447,971 | 9/1995 | Bergh et al. | 523/213 |
| 5,504,140 | 4/1996 | Zanzig et al. | 524/526 |
| 5,817,719 | 10/1998 | Zanzig et al. | 125/212 |
| 5,877,249 | 3/1999 | Lambotte | 524/493 |

*Primary Examiner*—Edward J. Cain
*Attorney, Agent, or Firm*—Alvin T Rockhill

[57] ABSTRACT

This invention relates to a tire tread compound that can be used in manufacturing tires having outstanding traction characteristics without compromising treadwear and rolling resistance. The tire tread compounds of this invention are made utilizing an isoprene-butadiene rubber having a high glass transition temperature and having $SnR_3$ end groups, wherein R represents an alkyl group, such as a tertiary-butyl group. These isoprene-butadiene rubbers are made by reacting an isoprene-butadiene rubber having a glass transition temperature which is within the range of about −50° C. to about 0° C. with a tin compound of the formula $SnR_3X$, wherein R represents an alkyl group and wherein X represents a halogen. This invention more specifically discloses a tire tread rubber composition which is comprised of (1) about 60 phr to about 95 phr of an isoprene-butadiene rubber having a glass transition temperature which is within the range of about −50° C. to about 0° C. and having —$SnR_3$ end groups, (2) about 5 phr to about 30 phr of natural rubber and (3) up to about 25 phr of a rubbery polymer having a low glass transition temperature which is within the range of about −85° C. to about −55° C., with the proviso that the total amount of the natural rubber and the rubbery polymer having a low glass transition temperature does not exceed about 40 phr. The rubbery polymer having a low glass transition temperature will typically be high cis-1,4-polybutadiene, isoprene-butadiene rubber, styrene-butadiene rubber or styrene-isoprene-butadiene rubber.

20 Claims, No Drawings

HIGH PERFORMANCE TIRE TREAD RUBBER COMPOSITION

BACKGROUND OF THE INVENTION

Typically, tire tread rubber formulations include a blend of rubbers of varied glass transition temperatures. Rubbers having low glass transition temperatures normally improve treadwear and rolling resistance and rubbers having high glass transition temperatures typically improve traction characteristics. However, it is normally difficult to improve the rolling resistance of a polymer system that contains a large amount of a polymer having a high glass transition temperature (Tg), such as an isoprene-butadiene rubber having a glass transition temperature which is within the range of about −50° C. to about 0° C. The high hysteresis characteristics of the rubber having the high glass transition temperature reduces rebound. The level of filler utilized can be reduced to improve rebound characteristics, but this increases cost and affects other compound properties. Increasing the cure level improves the rebound values, but it also affects other compound properties.

Low rolling resistance is an important characteristic of tires because good fuel economy is virtually always an important consideration. To attain good rolling resistance, rubbers in the tire tread compound having high glass transition temperatures also generally have high molecular weights (a Mooney ML 1+4 viscosity of about 70 to about 90). Isoprene-butadiene rubber having a low glass transition temperature can be utilized in such tire tread compounds to improve processing. However, when these low Tg isoprene-butadiene rubbers have a high molecular weight, the rubber compound becomes very difficult to process. On the other hand, decreasing the molecular weight of the isoprene-butadiene rubber improves processability but increases rolling resistance. The inclusion of low molecular weight isoprene-butadiene rubber in the tire tread rubber compound also increases cold flow which results in processing difficulties at tire manufacturing plants.

Good treadwear is also an important consideration because it is generally the most important factor which determines the life of the tire. The traction, treadwear and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubber material for automobile tire treads. However, such blends are not totally satisfactory for all purposes.

Rubbers having intermediate glass transition temperatures (−70° C. to −40° C.) compromise rolling resistance and treadwear without significantly increasing traction characteristics. For this reason, blends of rubbers having low glass transition temperatures and rubbers having high glass transition temperatures are frequently utilized to attain improved traction characteristics without significantly compromising rolling resistance or treadwear. However, such blends of rubbers having low glass transition temperatures and rubbers having high glass transition temperatures exhibit poor processability. This major disadvantage associated with such blends has greatly hampered their utilization in making tire tread compounds.

Tin-coupled polymers are known to provide desirable properties, such as improved treadwear and reduced rolling resistance, when used in tire tread rubbers. Such tin-coupled rubbery polymers are typically made by coupling the rubbery polymer with a tin coupling agent at or near the end of the polymerization used in synthesizing the rubbery polymer. In the coupling process, live polymer chain ends react with the tin coupling agent thereby coupling the polymer. For instance, up to four live chain ends can react with tin tetrahalides, such as tin tetrachloride, thereby coupling the polymer chains together. However, rubbery polymers having glass transition temperatures of greater than about −50° C. are difficult to couple with tin compounds, such as tin tetrahalides. It is accordingly not commercially feasible to couple rubbery polymers having a glass transition temperature which is within the range of about −50° C. to about 0° C.

SUMMARY OF THE INVENTION

This invention relates to a tire tread compound that can be used in manufacturing tires having outstanding traction characteristics without compromising treadwear and rolling resistance. The tire tread compounds of this invention are made utilizing an isoprene-butadiene rubber having a high glass transition temperature and having —$SnR_3$ end groups, wherein R represents an alkyl group, such as a tertiary-butyl group. These isoprene-butadiene rubbers are made by reacting an isoprene-butadiene rubber having a glass transition temperature which is within the range of about −50° C. to about 0° C. with a tin compound of the formula $SnR_3X$, wherein R represents an alkyl group and wherein X represents a halogen.

This invention more specifically discloses a tire tread rubber composition which is comprised of (1) about 60 phr to about 95 phr of an isoprene-butadiene rubber having a glass transition temperature which is within the range of about −50° C. to about 0° C. and having —$SnR_3$ end groups, (2) about 5 phr to about 30 phr of natural rubber and (3) up to about 25 phr of a rubbery polymer having a low glass transition temperature which is within the range of about −85° C. to about −55° C., with the proviso that the total amount of the natural rubber and the rubbery polymer having a low glass transition temperature does not exceed about 40 phr. The rubbery polymer having a low glass transition temperature will typically be selected from the group consisting of high cis-1,4-polybutadiene, isoprene-butadiene rubber, styrene-butadiene rubber or styrene-isoprene-butadiene rubber.

DETAILED DESCRIPTION OF THE INVENTION

The tire tread rubber compositions of this invention are comprised of (1) about 60 phr (parts per 100 parts by weight of rubber) to about 95 phr of an isoprene-butadiene rubber having a glass transition temperature which is within the range of about −50° C. to about 0° C. and having —$SnR_3$ end groups, (2) about 5 phr to about 30 phr of natural rubber and (3) optionally, up to about 25 phr of a rubbery polymer having a low glass transition temperature which is within the range of about −85° C. to about −55° C. However, it is critical for the total amount of the natural rubber and the rubbery polymer having a low glass transition temperature in the blend to not exceed about 40 phr.

The isoprene-butadiene rubber having —SnR$_3$ end groups will typically be prepared by reacting "living" isoprene-butadiene rubber having lithium end groups with a tin compound of the formula SnR$_3$X, wherein R represents an alkyl group and wherein X represents a halogen. The isoprene-butadiene rubber that is reacted with the tin compound will have a Tg which is within the range of about −50° C. to about 0° C. The isoprene-butadiene rubber will typically have a Tg which is within the range of about −47° C. to about −35° C. The isoprene-butadiene rubber will normally contain from about 15 weight percent to about 45 weight percent bound isoprene and from about 55 weight percent to about 85 weight percent bound butadiene. It will preferably contain from about 20 weight percent to about 40 weight percent bound isoprene and from about 60 weight percent to about 80 weight percent butadiene. The isoprene-butadiene rubber will most preferably contain from about 25 weight percent to about 35 weight percent isoprene and from about 65 weight percent to about 75 weight percent butadiene.

The step in which the —SnR$_3$ end group is bound to the isoprene-butadiene rubber will normally be carried out as a batch process. However, it is possible to functionalize living isoprene-butadiene polymer chains by the addition of tin compounds of the formula SnR$_3$X to a cement of the living polymer after the desired level of polymer conversion has been attained. In the tin compound of the formula SnR$_3$X employed in functionalizing the isoprene-butadiene rubber, R will typically represent an alkyl group containing from 1 to about 10 carbon atoms or an aryl group containing from 6 to about 10 carbon atoms, such as a phenyl group. In most cases, R will be an alkyl group containing from 3 to 6 carbon atoms, such as a tertiary-butyl group. The halogen in the tin compound will normally be fluorine, chlorine, bromine or iodine. It is normally preferred for X to represent chlorine or bromine with chlorine being most preferred.

The functionalization reaction can be depicted as follows:

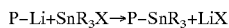

wherein P represents the polymer chain of the isoprene-butadiene rubber, wherein R represents an alkyl group and wherein X represents a halogen. As can be seen from this reaction, one mole of the tin compound (SnR$_3$X) is need for every mole of living lithium end groups on the isoprene-butadiene rubber.

Broadly, and exemplary, a range of about 0.01 to 4.5 milliequivalents of the tin compound of the formula SnR$_3$X is employed per 100 grams of the isoprene-butadiene rubber. It is normally preferred to utilize about 0.01 to about 1.5 milliequivalents of the tin compound per 100 grams of polymer to obtain the desired degree of functionalization. Larger quantities tend to result in the production of rubber compositions containing unreacted tin compound and lesser quantities result in less than an optimal degree of functionalization. One equivalent of the tin compound per equivalent of lithium is considered an optimum amount for maximum functionalization with —SnR$_3$ end groups. More specifically, one mole of the tin compound should be utilized per mole of live lithium ends.

The tin compound can be added to the polymer cement of living isoprene-butadiene rubber at any point after the desired level of polymer conversion has been attained by polymerization. The addition of the tin compound to the living polymer cement will, of course, kill the polymerization by reacting with living lithium end groups. The tin compound can be added in a hydrocarbon solution (e.g., in cyclohexane) to the polymerization admixture in the reactor or any other suitable vessel that can provide suitable mixing of the tin compound throughout the cement.

The isoprene-butadiene rubber having SnR$_3$ groups bonded thereto can be recovered from the organic solvent (polymer cement) and residue by means, such as decantation, filtration, centrification and the like. It is often desirable to precipitate the functionalized isoprene-butadiene rubber from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the isoprene-butadiene rubber from the polymer cement also "kills" any remaining residual living polymer by inactivating lithium end groups. After the functionalized isoprene-butadiene rubber is recovered from the polymer solution, steam-stripping can be employed to reduce the level of volatile organic compounds in the isoprene-butadiene rubber.

The tire tread rubber compositions of this invention are made by blending about 60 phr to about 95 phr of the isoprene-butadiene rubber having —SnR$_3$ end groups with about 5 phr to about 30 phr of natural rubber and optionally up to about 25 phr of a rubbery polymer having a low glass transition temperature which is within the range of about −85° C. to about −55° C. However, it is critical for the total amount of the natural rubber and the rubbery polymer having a low glass transition temperature in the blend to not exceed about 40 phm. The rubbery polymer having a low glass transition temperature will typically be high cis-1,4-polybutadiene, isoprene-butadiene rubber, styrene-butadiene rubber or styrene-isoprene-butadiene rubber. For instance, styrene-butadiene rubber having a vinyl content of 8 to 20 percent, a bound styrene content of 10 to 25 percent and a Tg of −82° C. to −55° C. can be employed in such blends. Coupled isoprene-butadiene rubbers having a Tg of less than −55° C. can also be employed in the blends of this invention. Such coupled isoprene-butadiene rubbers will normally be coupled with a Group IVa metal, such as tin.

The tire tread rubber compositions of this invention can be compounded utilizing conventional ingredients and standard techniques. For instance, these tire tread rubber blends will typically be mixed with carbon black, silica, sulfur, fillers, accelerators, oils, waxes, scorch inhibiting agents and processing aids. In most cases, the rubber blend will be compounded with sulfur and/or a sulfur-containing compound, carbon black, silica, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur-containing compound with 1 phr to 2.5 phr being preferred. It may be desirable to utilize insoluble sulfur in cases where bloom is a problem.

In the tread rubber compounds of this invention, a combination of silica and carbon black will be used as the filler. The silica will be utilized at a level which is within the range of about 5 phr to about 30 phr and the carbon black will be utilized at a level which is within the range of about 25 phr to about 50 phr. Clays and/or talc can be included in the filler to reduce cost. The blend will also normally include from 0.1 to 2.5 phr of at least one accelerator with 0.2 to 1.S phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The rubber blends of this invention will also normally contain from 0.5 to 10 phr of zinc oxide with 1 to 5 phr being preferred. These rubber blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

To fully realize the total advantages of the blends of this invention, the processing of the rubber blend is normally conducted in the presence of a sulfur containing organosilicon compound. Examples of suitable sulfur-containing organosilicon compounds are of the formula:

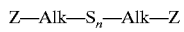   (I)

in which Z is selected from the group consisting of

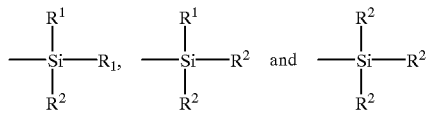

where $R^1$ is an alkyl group of 1 to 4 carbon atoms, cyclohexyl or phenyl; wherein $R^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl) tetrasulfide. Therefore, as to Formula I, preferably Z is

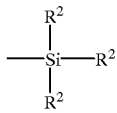

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica. It is to be appreciated that the silica coupler may be used in conjunction with carbon black (namely, premixed with carbon black prior to addition to the rubber composition) and such carbon black is to be included in the aforesaid amount of carbon black for the rubber composition formulation.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600 and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400 and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black, if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The tire tread compounds of this invention can be used in tire treads in conjunction with ordinary tire manufacturing techniques. Tires are built utilizing standard procedures with the rubber blend of this invention simply being substituted for the rubber compounds typically used as the tread rubber. After the tire has been built with the isoprene-butadiene rubber-containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

By utilizing the rubber blends of this invention in tire tread compounds, processing characteristics can be improved without compromising treadwear or rolling resistance. Since the rubber blends of this invention do not contain styrene, the cost of raw materials can also be reduced. This is because styrene and other vinyl aromatic monomers are expensive relative to the cost of 1,3-butadiene and isoprene.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1–4

In this experiment, an isoprene-butadiene rubber (IBR) having —SnR$_3$ end was prepared in a one-gallon (3.8 liters) batch reactor at 70° C. In the procedure used, 2,000 grams of a silica/molecular sieve/aluminum dried premix containing 19.0 weight percent of a mixture of isoprene and 1,3-butadiene in hexanes at the ratio of 50:50 was charged into a one-gallon (3.8 liters) reactor. After the amount of impurity in the premix was determined, 4.0 ml of a 1.0 M solution of n-butyl lithium (in hexane) was added to the reactor. The target Mn (number averaged molecular weight) was 100,000. The polymerization was allowed to proceed at 70° C. for three hours. An analysis of the residual monomer indicated that monomers were all consumed. Then, 4.0 ml of a 1 M solution of tri-t-butyl tin chloride (in hexane) was added to the reactor and the functionalization reaction was carried out at the same temperature for 30 minutes. Then, 1.5 phr (parts per 100 parts by weight of rubber) of 4-t-butylcatechol and 0.5 phr of TMEDA was added to the reactor to shortstop the polymerization and to stabilize the polymer.

Then, 80 phr of the tin functionalized isoprene-butadiene rubber which had a Mooney ML 1+4 viscosity of 76 was blended with 20 phr of natural rubber, 47 phr of carbon black, 5 phr of a processing oil, 2.75 phr of an antioxidant, 2.8 phr of waxes, 1.5 phr of stearic acid, 3.5 phr of zinc oxide, 1.7 phr of accelerators and 1.4 phr of sulfur. An additional tin functionalized isoprene-butadiene rubber having a Mooney ML 1+4 viscosity of 45 was also compounded using the same recipe (Example 2). As a control, an isoprene-butadiene rubber having a Mooney ML 1+4 viscosity of 83 was also compounded using the same recipe (Example 3). As another control (Example 4), a blend containing 10 phr of natural rubber, 20 phr of polybutadiene rubber having a Tg of −104° C. and Mooney ML 1+4 of 50, 20 phr of emulsion styrene-butadiene rubber having a Tg of −35° C., 50 phr of high vinyl polybutadiene rubber having a Tg of −43° C., 76 phr of silica and 12 phr of Si69 silica coupling agent further compounded employing the same cure package.

A summary of each of the four compounded rubber blends made is provided in Table I. Each of these compounded rubber blends were cured and evaluated to determine physical characteristics. The results of these evaluations are shown in Table II.

TABLE I

|  | 1 | 2 | 3 | 4 |
|---|---|---|---|---|
| IBR (50/50 Tq = −47 ML = 76, Sn—F) | 80 |  |  |  |
| IBR (50/50 Tq = −47 ML = 45 Sn—F) |  | 80 |  |  |
| IBR (50/50 Tq = −47 ML = 83) |  |  | 80 |  |
| NR | 20 | 20 | 20 | 10 |
| PBD (Tq = −104) |  |  |  | 20 |

TABLE I-continued

|  | 1 | 2 | 3 | 4 |
|---|---|---|---|---|
| E-SBR (Tq = −35) |  |  |  | 20 |
| HYPBD (Tq = −43) |  |  |  | 50 |
| Carbon Black | 47 | 47 | 47 |  |
| Silica |  |  |  | 76 |

TABLE II

| Example | 1 | 2 | 3 | 4 |
|---|---|---|---|---|
| Stress-Strain 18 @ 150 | | | | |
| 100% | 2.35 | 2.24 | 2.1 | 2.38 |
| 300% | 9.42 | 10.34 | 8.59 | 13.41 |
| Brk Str, MPa | 11.71 | 13.96 | 13.58 | 16.72 |
| EL-Brk, % | 387 | 411 | 460 | 386 |
| Hardness RT | 63.2 | 61.1 | 63.1 | 62.3 |
| 100 C. | 58.2 | 56.3 | 57.7 | 59.1 |
| Rebound RT | 53.2 | 50.6 | 48 | 47.7 |
| 100 C. | 68.5 | 67.3 | 65 | 70.4 |
| Peel Adhesion 95 C. | | | | |
| Newtons | 31 | 44 | 43 | 65 |
| Rheometer 150 C. | | | | |
| ML | 18.5 | 8.5 | 13.8 | 10.8 |
| MH | 43 | 39 | 40.3 | 41.5 |
| T25 | 3.75 | 4 | 3.75 | 6.75 |
| T90 | 7.25 | 7.75 | 7.75 | 13 |
| delta torque | 24.5 | 30.5 | 26.5 | 30.7 |
| RPA Uncured 100 C., 15%, .833 Hz | | | | |
| G' | 410 | 217 | 316 | 205 |
| Cured 100 C., 11 Hz | | | | |
| G' 1% | 1961 | 1918 | 2204 | 2182 |
| G' 5% | 1543 | 1467 | 1594 | 1747 |
| G' 14% | 1310 | 1227 | 1296 | 1437 |
| DIN Abrasion | | | | |
| 10 N | 147 | 140 | 149 | 129 |
| RSA Temperature sweep | | | | |
| 0 C. | 0.138 | 0.153 | 0.143 | 0.202 |
| −10 C. | 0.24 | 0.251 | 0.237 | 0.307 |
| −20 C. | 0.43 | 0.447 | 0.423 | 0.46 |
| −30 C. | 0.802 | 0.821 | 0.735 | 0.56 |
| −35 C. | 0.909 | 0.9 | 0.865 | 0.615 |
| −40 C. | 0.605 | 0.578 | 0.619 | 0.60 |

This invention deals with improving the rolling resistance (RR) and traction of high performance treads. Examples 1 and 2 demonstrate the advantages of tin-functionalized polymers versus a linear control (Example 3). The advantage is reduced RR (higher rebound values) through improved dispersion of the filler and the reduction in the number of chain ends. when comparing a typical high performance tread (Example 4) with Examples 1 and 2, the new polymers combined with lower levels of carbon black should significantly improve RR and wet traction. The improved RR is suggested in the increased rebound values for Examples 1 and 2 while the high tan delta values at low temperature (−10C to −40C) indicate significant improvements in wet traction.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire tread rubber composition which is comprised of (1) about 60 phr to about 95 phr of an isoprene-butadiene rubber having a glass transition temperature which is within the range of about −50° C. to about 0° C. and having —$SnR_3$ end groups, (2) about 5 phr to about 30 phr of natural rubber and (3) up to about 25 phr of a rubbery polymer having a low glass transition temperature which is within the range of about −85° C. to about −55° C., with the proviso that the total amount of the natural rubber and the rubbery polymer having a low glass transition temperature does not exceed about 40 phr.

2. A tire tread rubber as specified in claim 1 wherein the rubbery polymer having a low glass transition temperature is selected from the group consisting of high cis-1,4-polybutadiene, isoprene-butadiene rubber, styrene-butadiene rubber and styrene-isoprene-butadiene rubber.

3. A tire tread rubber as specified in claim 1 wherein R represents an alkyl group that contains from 1 to about 10 carbon atoms.

4. A tire tread rubber as specified in claim 1 wherein R represents an aryl group that contains from 6 to about 10 carbon atoms.

5. A tire tread rubber as specified in claim 1 wherein R represents an alkyl group that contains from 3 to 6 carbon atoms.

6. A tire tread rubber as specified in claim 5 wherein R represents a tertiary-butyl group.

7. A tire tread rubber as specified in claim 4 wherein R represents a phenyl group.

8. A tire tread rubber as specified in claim 1 wherein the rubber in the tread rubber consists essentially of the isoprene-butadiene rubber and the natural rubber.

9. A tire tread rubber as specified in claim 1 wherein the rubbery polymer having a low glass transition temperature is cis-1,4-polybutadiene.

10. A tire tread rubber as specified in claim 1 wherein the rubbery polymer having a low glass transition temperature is isoprene-butadiene rubber.

11. A tire tread rubber as specified in claim 1 wherein the rubbery polymer having a low glass transition temperature is styrene-butadiene rubber.

12. A tire tread rubber as specified in claim 1 wherein the rubbery polymer having a low glass transition temperature is styrene-isoprene-butadiene rubber.

13. A tire having a tread which is comprised of the tire tread rubber specified in claim 1.

14. A tire tread rubber as specified in claim 1 which is further comprised of a silica filler.

15. A tire tread rubber as specified in claim 14 which is further comprised of a silica coupling agent.

16. A tire tread rubber as specified in claim 1 wherein said tire tread rubber is further comprised of an isoprene-butadiene rubber having a glass transition temperature of less than −55° C.

17. A tire tread rubber as specified in claim 16 wherein the isoprene-butadiene rubber having a glass transition temperature of less than −55° C. is coupled.

18. A tire tread rubber as specified in claim 17 wherein the isoprene-butadiene rubber having a glass transition temperature of less than −55° C. is tin-coupled.

19. A tire tread rubber as specified in claim 17 wherein the isoprene-butadiene rubber is coupled with a Group IVa metal.

20. A tire tread rubber as specified in claim 19 wherein R represents a tertiary-butyl group.

* * * * *